United States Patent [19]

Bäbler

[11] 4,250,079

[45] Feb. 10, 1981

[54] PROCESS FOR THE MANUFACTURE OF A PERYLENE-3,4,9,10-TETRACARBOXYLIC DIANHYDRIDE PIGMENT WITH IMPROVED PROPERTIES

[75] Inventor: Fridolin Bäbler, Allschwil, Switzerland

[73] Assignee: Ciba-Geigy Corporation, Ardsley, N.Y.

[21] Appl. No.: 37,600

[22] Filed: May 10, 1979

[30] Foreign Application Priority Data

May 18, 1978 [CH] Switzerland ................. 5389/78

[51] Int. Cl.³ .............................................. C08K 5/00
[52] U.S. Cl. ................................ 260/42.21; 260/37 P; 260/42.46; 260/42.49; 546/37
[58] Field of Search ............ 546/37; 260/42.21, 42.46, 260/37 P, 42.49

[56] References Cited

U.S. PATENT DOCUMENTS

| | | | |
|---|---|---|---|
| 2,543,747 | 3/1951 | Shrader | 546/37 |
| 3,112,289 | 11/1963 | Stocker | 260/42.21 |
| 3,357,983 | 12/1967 | Weener et al. | 546/37 |
| 3,554,776 | 1/1971 | Gerson et al. | 546/37 |
| 3,628,976 | 12/1971 | Stocker | 106/308 F |
| 3,775,434 | 11/1973 | Spietschka et al. | 260/345.2 |
| 3,872,103 | 3/1975 | Fabian | 260/333 |

OTHER PUBLICATIONS

Chemical Abstracts, vol. 59, #11764c.

*Primary Examiner*—Melvyn I. Marquis
*Attorney, Agent, or Firm*—Luther A. R. Hall; Joseph F. DiPrima

[57] ABSTRACT

A process for the manufacture of perylenetetracarboxylic dianhydride pigments having improved dispersibility, which comprises adding at least one primary aliphatic or cycloaliphatic amine containing at least 12 carbon atoms to an aqueous alkaline solution of an alkali metal salt or ammonium salt of perylenetetracarboxylic acid, acidifying the reaction mixture, whereupon the free perylenetetracarboxylic acid precipitates and is then converted by heating the reaction mixture into the dianhydride, which is isolated in the conventional manner.

13 Claims, No Drawings

PROCESS FOR THE MANUFACTURE OF A PERYLENE-3,4,9,10-TETRACARBOXYLIC DIANHYDRIDE PIGMENT WITH IMPROVED PROPERTIES

It is known that perylene-3,4,9,10-tetracarboxylic dianhydride can be used for colouring lacquers and plastics (cf. for example Swiss patent specifications Nos. 384 204 and 369 246). Various processes are known for converting industrially available perylene-3,4,9,10-tetracarboxylic dianhydride into pigment form, for example precipitation from sulfuric acid, grinding, and recrystallisation from solvents. Not only are the colour strength and purity of shade obtained with such pigments unsatisfactory, especially when they are incorporated in plastics, but these processes are also rather uneconomic, for they require an additional process step. In Swiss patent specification No. 485 008, the proposal is made to add organic or inorganic acids to the alkaline solution of a salt of perylenetetracarboxylic acid in the presence of a dispersant at elevated temperature, whereupon the perylenetetracarboxylic dianhydride precipitates in pigment form. The resulting pigment is suitable for colouring lacquers, but is less suitable for incorporation in plastics on account of its insufficient dispersibility. British patent specification No. 1 352 542 also discloses a process for conditioning perylenetetracarboxylic dianhydride, wherein the alkaline solution of a salt of perylenetetracarboxylic acid is converted into the free tetracarboxylic acid, which is heated in an organic solvent to temperatures between 35° and 200° C. The drawback of this process is that about 10 parts by volume of solvent are required per 1 part by weight of pigment; moreover, the resulting pigment is also insufficiently dispersible when incorporated in plastics.

It has now been found that a perylenetetracarboxylic dianhydride pigment with improved properties, in particular in plastics, most particularly in rigid and plasticised polyvinyl chloride, are obtained in a relatively simple manner by adding at least one primary aliphatic or cycloaliphatic amine containing at least 12 carbon atoms to an aqueous alkaline solution of an alkali metal salt or ammonium salt of perylenetetracarboxylic acid, acidifying the reaction mixture, whereupon the free perylenetetracarboxylic acid precipitates and is then converted by heating the reaction mixture into the dianhydride, which is isolated in the conventional manner.

The starting material employed is e.g. the purified alkaline solution obtained in the manufacture of perylene-3,4,9,10-tetracarboxylic acid (Bios Final Report 1484). However, it is also possible to use pure perylene-3,4,9,10-tetracarboxylic dianhydride as starting material and to prepare an aqueous salt solution therefrom.

Suitable salts of perylenetetracarboxylic acid are, in particular, the sodium or potassium salts. It is also immaterial with which alkalies the alkaline solution has been prepared. Preferably, however, potassium is used. The concentration of the aqueous alkaline potassium salt solution of the perylenetetracarboxylic acid is advantageously about 9%.

The aliphatic amines employed preferably contain at least 12 carbon atoms, for example laurylamine, myristylamine, cetylamine and, in particular, stearylamine. A suitable cycloaliphatic amine is e.g. abietylamine, dehydro-, dihydro- or tetrahydroabietylamine. Mixtures of different amines can also be used. The amount of amine employed is advantageously such that no substantial impairment of the resistance of the perylenetetracarboxylic dianhydride to migration and bleeding is caused. These disadvantages are usually avoided by using 0.01 to 0.2 mole of the amine, based on 1 mole of perylenetetracarboxylic acid. Particularly good results are obtained using 0.03 to 0.08 mole of the amine, based on 1 mole of pigment.

The process is advantageously carried out by dissolving the amine in an organic solvent or solvent mixture, preferably an aliphatic alcohol containing 1 to 4 carbon atoms, for example methanol, ethanol, propanol, isopropanol, 1-butanol and 2-butanol, adding to this solution an inorganic acid, for example hydrochloric acid, in the amount required for liberating the perylenetetracarboxylic acid, and adding dropwise to this mixture the aqueous solution of the alkali metal salt of the perylenetetracarboxylic acid or adding dropwise the amine-containing mixture to the aqueous solution of the alkali metal salt of the perylenetetracarboxylic acid. It is advantageous to use 1 to 4 parts by volume of organic solvent per 1 part by weight of pigment.

The precipitation of the perylenetetracarboxylic acid can be effected with any inorganic or organic acids which are stronger than perylenetetracarboxylic acid itself. Examples of such acids are: hydrochloric acid, sulfuric acid, phosphoric acid, nitric acid or lower aliphatic carboxylic acids, such as formic acid, or aromatic sulfonic acids, such as benzenesulfonic or p-toluenesulfonic acid. Preferably hydrochloric or sulfuric acid in the form of a 10 to 50% aqueous solution is used. Furthermore, it is possible to add the acids in the form of solutions in organic solvents or in gaseous form as hydrogen chloride. At all events, however, the treatment with acid is effected such that the perylenetetracarboxylic acid and not its dianhydride is precipitated. The addition of the acid can be made at 0°–100° C., preferably 30°–70° C.

The amount of amine can be reduced when carrying out the process in the presence of a texture improver. Examples of texture improvers are, in particular, fatty acids containing at least 18 carbon atoms, for example stearic acid or behenic acid, or their amides or salts, in particular magnesium salts, and also plasticisers, waxes, resinic acids, such as abietic acid, colophonium soap, alkyl phenols or aliphatic alcohols, such as stearyl alcohol. Preferably 0.02 to 0.2 mole of the texture improver per 1 mole of pigment is used.

The dianhydride is formed by heating the acid suspension of the perylenetetracarboxylic acid, advantageously under reflux. When the reaction is complete, the solvent can optionally be distilled off.

The resulting pigment can be worked up in the conventional manner, for example by filtration or centrifuging and drying, e.g. in vacuo or in a recirculated air drier, fluidised bed drier or vacuum freeze drier, or also by spray drying. The pigment, in which a small portion of the molecule contains an imide group derived from the amine employed instead of the anhydride group, is suitable for all applications for which perylenetetracarboxylic anhydride is used. Compared with the perylenetetracarboxylic dianhydride pigments of the prior art, the pigment of the present invention is distinguished by a substantially better dispersibility. In contradistinction to the known pigments, it is therefore especially suitable for pigmenting plastics, such as plasticised and rigid polyvinyl chloride, and polyolefins. It is also surprising that, in spite of the presence of long carbon chains in the imide group, the treated pigment has very good fastness to migration and resistance to blooming. When incorporated in lacquer systems, especially stoving lacquers and metallic pigmented paints, it produces pure, very strong colourations with excellent fastness properties. It will be readily understood that the pigment can also be used in the form of a preparation that contains an organic carrier.

In the following Examples the parts and percentages are by weight unless otherwise indicated.

EXAMPLE 1

With stirring, 27.4 parts of crude perylene-3,4,9,10-tetracarboxylic dianhydride are added to a solution of 19.2 parts of 85% potassium hydroxide in 460 parts of water. The suspension is heated to 80° C., whereupon a solution forms with simultaneous formation of the potassium salt of perylene-3,4,9,10-tetracarboxylic acid. In a second stirred vessel, 2.3 parts of stearylamine are suspended in 60 parts by volume of isopropanol and 35 parts by volume of about 37% aqueous hydrochloric acid at about 60° C.

The alkaline perylenetetracarboxylic acid solution is added dropwise to the stearylamine/isopropanol/hydrochloric acid suspension in the course of 15 minutes at 60° C., whereupon the perylenetetracarboxylic acid precipitates. The formation of the anhydride imide is brought to completion by boiling the still acid suspension for 3 hours at reflux temperature. The red pigment suspension is filtered at about 70° C. The filter cake is washed neutral with cold water and dried in a vacuum cabinet at 80° C., affording 28.8 parts of stearylamine-modified perylene-3,4,9,10-tetracarboxylic dianhydride pigment. When incorporated in powder form in plasticised PVC rolled sheets, this pigment produces strong, red colourations of excellent fastness properties and has extremely good dispersibility.

EXAMPLE 2

27.4 parts of crude perylenetetracarboxylic dianhydride in the form of the potassium salt of perylenetetracarboxylic acid are dissolved in aqueous potassium hydroxide solution as described in Example 1. To this solution are added 2 parts of stearic acid, dissolved in 60 parts by volume of 1% potassium hydroxide solution. With stirring, the alkaline perylenetetracarboxylic acid/stearic acid solution is added dropwise in the course of 15 minutes at 60° C. to a suspension consisting of 1.4 parts of $MgCl_2.6H_2O$, 0.7 parts of stearylamine, 35 parts by volume of about 37% aqueous hydrochloric acid and 60 parts by volume of isopropanol. The formation of the anhydride imide is brought to completion by stirring the acid suspension for 3½ hours at reflux temperature. The red pigment suspension is then filtered at about 70° C. The filter cake is washed neutral with cold water and dried in a vacuum cabinet at 80° C., affording 29.8 parts of a perylene pigment with properties as good as those of the pigment of Example 1.

EXAMPLE 3

A red perylene pigment with equally good properties is obtained by repeating the procedure of Example 2, but using 1.1 parts of abietylamine instead of 0.7 part of stearylamine.

EXAMPLE 4

A red perylene pigment with equally good properties is obtained by repeating the procedure of Example 2, but using a mixture of 0.4 part of stearylamine and 0.4 part of cetylamine instead of 0.7 part of stearylamine.

EXAMPLE 5

27.4 parts of crude of perylenetetracarboxylic dianhydride in the form of the potassium salt of perylenetetracarboxylic acid are dissolved in aqueous potassium hydroxide solution as described in Example 1. To this solution are added 2 parts of stearic acid, dissolved in 60 ml of aqueous 1% potassium hydroxide solution.

0.7 part of stearylamine are dissolved warm in 60 ml of isopropanol and to this solution are added 35 parts by volume of about 37% aqueous hydrochloric acid. With stirring, the alkaline perylenetetracarboxylic acid/stearic acid solution is added dropwise to this mixture in the course of 15 minutes at 60° C. The formation of the anhydride imide is brought to completion by stirring the acid suspension for 3½ hours at reflux temperature. The red pigment suspension is then filtered at about 70° C. The filter cake is washed neutral with water and dried in a vacuum cabinet at 80° C., affording 29.8 parts of a perylene pigment which produces strong red colourations of excellent fastness properties when it is incorporated in alkylmelamine stoving lacquers.

EXAMPLE 6

A red perylene pigment with equally good properties is obtained by repeating the procedure of Example 5, but using a mixture of 0.4 part of stearylamine and 0.4 part of laurylamine instead of 0.7 part of stearylamine.

EXAMPLE 7

A red perylene pigment with equally good properties is obtained by repeating the procedure of Example 5, except that the isopropanol is distilled off before the filtration of the red perylenetetracarboxylic dianhydride imide pigment suspension.

EXAMPLE 8

A red perylene pigment with equally good properties is obtained by repeating the procedure of Example 5, but using the same amount of methanol instead of isopropanol.

EXAMPLE 9

A red perylene pigment with equally good properties is obtained by repeating the procedure of Example 5, but using the same amount of ethanol instead of isopropanol.

EXAMPLE 10

A perylene pigment with equally good properties is obtained by repeating the procedure of Example 5, but using the same amount of 1-butanol instead of isopropanol.

EXAMPLE 11

A mixture of 130 parts of steatite balls (diameter 8 mm), 47.5 parts of an alkyd melamine stoving lacquer consisting of 60 parts of Beckosol 27-320, 60% in xylene (Reichhold Chemie AG), 36 parts of Super-Beckamin 13-501, 50% (Reichhold Chemie AG), 2 parts of xylene and 2 parts of methyl glycol, and 2 parts of the perylene pigment of Example 2, is dispersed in a glass bottle with twist-off stopper for 120 hours on a roller gear bed. The steatite balls are removed and then 2.4 parts of the dispersed masstone mixture, 6 parts of titanium dioxide Kronos RN 59 (Kronos Titan GmbH) and 24 parts of the above alkyd melamine stoving lacquer are well mixed and sprayed onto aluminium sheets. After stoving for 30 minutes at 130° C., very strong red colourations of excellent fastness properties are obtained.

Equally good colourations are obtained by using a pigment of Examples 1 and 3–10 instead of the pigment of Example 2.

EXAMPLE 12

A mixture of 130 parts of steatite balls (diameter 8 mm), 47.5 parts of a thermo-hardening acrylic lacquer consisting of 41.3 parts of Viacryl VC 373, 60% (VIANOVA Kunstharz AG), 16.3 parts of Maprenal TTX, 55% (Hoechst AG), 32.8 parts of xylene, 4.6 parts of ethyl glycol acetate, 2 parts of butyl acetate and 1 part of silicone oil A, 1% in xylene (Bayer AG), and 2.5 parts of the perylene pigment of Example 5, is dispersed in a 200 ml glass bottle with twist-off stopper for 72 hours on a roller gear bed. The steatite balls are removed and then 8 parts of the dispersed masstone mixture, 0.6 part of alcoa paste with 60–65% aluminium content (Aluminium Corp. of America), 1 part of methyl ethyl ketone and 18.4 parts of the above acrylic lacquer are sprayed on aluminium sheets. After stoving for 30 minutes at 130° C., very strong red metal finish colourations of excellent fastness properties are obtained.

Equally good colourations are obtained by using a pigment of Examples 1–4 or 6–10 instead of the pigment of Example 5.

EXAMPLE 13

65 parts of stabilised polyvinyl chloride, 35 parts of dioctyl phthalate and 0.2 parts of a pigment obtained in any one of Examples 1–10 are stirred together and the mixture is rolled for 7 minutes at 140° C. on a two-roll mill. On account of the very good dispersibility of the pigment, a uniformly pigmented sheet coloured in a very strong red shade of excellent fastness properties is obtained.

EXAMPLE 14

A mixture consisting of 92 parts of vinyl resin VINNOL H65D (Wacker, Munich), 8 parts of vinyl copolymer VESTOLIT HIS 7587 (Hüls), 1.5 parts of plasticiser REOPLAST 39 (CIBA-GEIGY AG), 1.4 parts of stabiliser IRGASTAB BC-10 (CIBA-GEIGY AG), 1.4 parts of stabiliser IRGASTAB BC-29 (CIBA-GEIGY AG), 0.7 part of auxiliary stabiliser IRGASTAB CH-300 (CIBA-GEIGY AG), 0.4 part of lubricant IRGAWAX 370 (CIBA-GEIGY AG), 0.2 part of lubricant IRGAWAX 360 (CIBA-GEIGY AG) and 0.25 part of UV absorber TINUVIN 320 (CIBA-GEIGY AG), is prepared in a fluid mixer (Papenmeier K.G., Detmold) by stirring for about 5 minutes at a speed of about 1400 rpm.

1.5 parts of the rigid PVC compound so obtained and 0.075 part of the perylene pigment of Example 5 are mixed at room temperature for about 3 minutes in a Henschel mixer (Henschel GmbH, Kassel) at a speed of about 2000 rpm. The pigmented rigid PVC compound is rolled on a roll mill at 190° C. for 6 minutes at 25 rpm and a friction of 1:1.2, and pressed at 190° C. for 6 minutes on a Bürkle press between chromium-plated steel plates to a thickness of about 1 mm. The resulting red moulding has excellent lightfastness and resistance to atmospheric influences on exposure.

What is claimed is:

1. A process for the manufacture of a modified perylenetetracarboxylic acid pigment composition, having extremely good dispersibility and a small portion of imide groups present in the pigment, which process comprises
    (a) adding 0.01 to 0.2 moles of at least one primary aliphatic or cycloaliphatic amine having at least 12 carbon atoms, per each mole of perylenetetracarboxylic acid to an aqueous alkaline solution of an alkali metal salt or ammonium salt of perylenetetracarboxylic acid,
    (b) acidifying the reaction mixture to precipitate free perylenetetracarboxylic acid at a temperature between 0° and 100° C.,
    (c) heating the reaction mixture to reflux to convert the acid to the corresponding anhydride, and
    (d) isolating the pigment composition.
2. A process for pigmenting plastics which comprises incorporating therein an effective amount of a pigment composition according to claim 1.
3. A pigmented composition which comprises (a) a high molecular weight polymer; and (b) an effective amount of a pigment composition according to claim 1.
4. A process according to claim 1 which comprises adding stearylamine as primary aliphatic amine.
5. A process according to claim 1 which comprises adding 0.03 to 0.08 mole of amine, per each mole of pigment.
6. A process according to claim 1, wherein a solution of the amine in an organic solvent is added.
7. A process according to claim 6, wherein the organic solvent is an alcohol or mixture of monovalent aliphatic alcohols containing 1 to 4 carbon atoms.
8. A process according to claim 6 which comprises adding 1 to 4 parts of solvent per 1 part of pigment.
9. A process according to claim 1, wherein the treatment with amine is carried out in the presence of a texture improver.
10. A process according to claim 9, wherein the texture improver is a fatty acid containing at least 18 carbon atoms, or a salt or amide thereof.
11. A process according to claim 9 which comprises adding 0.02 to 0.2 mole of texture improver, per each mole of pigment.
12. A process according to claim 9 which comprises adding 0.03 to 0.08 mole of amine and 0.02 to 0.1 mole of texture improver, per each mole of pigment.
13. The modified perylenetetracarboxylic dianhydride pigments obtained according to claim 1.

* * * * *